US012578617B2

(12) United States Patent
Imai et al.

(10) Patent No.: US 12,578,617 B2
(45) Date of Patent: Mar. 17, 2026

(54) OPTICAL COMB GENERATION DEVICE

(71) Applicant: SUZHOU HYC TECHNOLOGY CO., LTD., Suzhou City (CN)

(72) Inventors: Kazuhiro Imai, Tokyo (JP); Motonobu Kourogi, Tokyo (JP)

(73) Assignee: SUZHOU HYC TECHNOLOGY CO., LTD., Suzhou City (CN)

( * ) Notice: Subject to any disclaimer, the term of this patent is extended or adjusted under 35 U.S.C. 154(b) by 321 days.

(21) Appl. No.: 18/263,019

(22) PCT Filed: Aug. 30, 2021

(86) PCT No.: PCT/JP2021/031730
§ 371 (c)(1),
(2) Date: Jul. 26, 2023

(87) PCT Pub. No.: WO2022/162987
PCT Pub. Date: Aug. 4, 2022

(65) Prior Publication Data
US 2024/0085759 A1      Mar. 14, 2024

(30) Foreign Application Priority Data

Jan. 26, 2021      (JP) ................................. 2021-010486

(51) Int. Cl.
*G02F 1/35*           (2006.01)
(52) U.S. Cl.
CPC ........ *G02F 1/3536* (2013.01); *G02F 2203/56* (2013.01)
(58) Field of Classification Search
CPC ........................... G02F 1/3536; G02F 2203/56
See application file for complete search history.

(56) References Cited

U.S. PATENT DOCUMENTS 6,480,006 B1 * 11/2002 Buckley ................. G01R 29/26
324/76.23
6,493,091 B2 * 12/2002 Kourogi ............. G01N 21/4795
356/489

(Continued)

FOREIGN PATENT DOCUMENTS

JP          A 1999288014          10/1999
JP          A 2001227911          8/2001

(Continued)

OTHER PUBLICATIONS

Generation of 10-GHz 2-ps optical pulse train over the C band based on an optical comb generator and its application to 160-Gbit/s OTDM systems, Koji Igarashi, Sep. 21, 2008, 34th European Conference on Optical Communication.

(Continued)

*Primary Examiner* — Kenneth N Vanderpuye
*Assistant Examiner* — Asif Shameem
(74) *Attorney, Agent, or Firm* — Birch, Stewart, Kolasch & Birch, LLP

(57)          ABSTRACT

By inputting a modulation signal from a synthesizer circuit 11 to a switching circuit 13 via isolator elements 12A, 12B by inserting the isolator elements 12A, 12B between the synthesizer circuit 11 and the switching circuit 13, an operation of the synthesizer circuit 11 is prevented from being unstable with a load fluctuation by an opening or a short-circuit of circuits after the switching circuit, so an operation of the synthesizer circuit 11 will not be unstable by a load fluctuation when switching driving signals supplied to optical comb generators 14A, 14B by the switching circuit 13, and a driving state is transited by switching the driving signals of the optical comb generators 14A, 14B rapidly.

6 Claims, 10 Drawing Sheets

(56)                    References Cited

U.S. PATENT DOCUMENTS

| | | | | |
|---|---|---|---|---|
| 8,750,717 B1 * | 6/2014 | Yap | ........................... | G02F 2/02 |
| | | | | 398/163 |
| 9,348,195 B2 * | 5/2016 | Kwon | ..................... | G02F 1/383 |
| 2001/0045513 A1 | 11/2001 | Kourogi | | |
| 2007/0263578 A1 * | 11/2007 | Nakaso | ............. | H04W 36/0011 |
| | | | | 370/338 |
| 2024/0192365 A1 * | 6/2024 | Imai | ........................ | G01S 17/36 |

FOREIGN PATENT DOCUMENTS

| | | | |
|---|---|---|---|
| JP | A 2001343234 | 12/2001 | |
| JP | A 2009244621 | 10/2009 | |
| JP | A 2010217454 | 9/2010 | |
| JP | 2011027649 A | 2/2011 | |
| JP | A 2012128400 | 7/2012 | |
| JP | B 005231883 | 7/2013 | |
| JP | 6019360 B2 * | 11/2016 | |
| JP | A 2020012641 | 1/2020 | |

OTHER PUBLICATIONS

Phase-Locked Loop (PLL) Fundamentals, Ian Collins, Analog Dialogue 52-07, Jul. 2018.
Extended European Search Report, Jul. 9, 2024, EP 21922995.

* cited by examiner

Time waveform
DBM IF Output

Phase of 500 kHz
Phase of 500 kHz component

FFT Analysis
Power ratio of 500 kHz ⇒ Looks like it is being stable immediately after switching
Proportion of 500 kHz component FFT Analysis
Enlarged chart of power ratio of 500 kHz ⇒ Vibration remains at 250 section ⇒ Frequency is unstable
Proportion of 500 kHz component (Enlarged chart)

Time waveform
DBM IF Output

Phase of 500 kHz

FFT Analysis
Power ratio of 500 kHz

FFT Analysis
Enlarged chart of power ratio of 500 kHz

OPTICAL COMB GENERATION DEVICE

BACKGROUND OF THE INVENTION

Field of the Invention

The present invention relates to an optical comb generation device used for example for an optical comb distance meter for measuring a distance from a time difference between an interference signal of a measuring light and an interference signal of a reference light. The present application claims priority based on Japanese Patent Application No. 2021-010486 filed in Japan on Jan. 26, 2021, which is incorporated by reference herein.

Description of Related Art

Conventionally, as an active distance measuring method capable of measuring a precise distance of a point, a distance measurement by a principle of optics using a laser light is known. In a laser distance meter for measuring a distance to a target object by using a laser light, a distance to an object to be measured is calculated based on a difference between a time of emission of a laser light and a time when the laser light reflected from the object to be measured is detected by a light receiving element (for example, refer to Patent Document 1). Also, for example, a driving current of a semiconductor laser is modulated by a triangular wave or the like, and a reflected light from a target object is received by using a photodiode embedded in a semiconductor laser element, and a distance information is obtained from a frequency of a sawtooth wave occurred in a photodiode output current.

A laser distance meter as a device for measuring an absolute distance from a certain point to a measuring point with high accuracy is known. For example, in Patent Document 1, a distance meter for measuring a distance from a time difference between an interference signal of a measuring light and an interference signal of a reference light is described.

In a conventional absolute distance meter, it was difficult to achieve a practical absolute distance meter capable of measuring a long distance with high accuracy. Also, in order to obtain high resolution, a return to origin was necessary as a laser displacement meter. So, there was only a method or means not suitable for an absolute distance measurement.

The present inventors have previously proposed an optical comb distance meter, comprising two optical comb generators for emitting a pulse of a reference light and a measuring light with a coherence and mutually different modulation cycles, respectively modulated of its phase or intensity periodically, wherein a reference light detector detects an interference light of a reference light pulse emitted to a reference surface and a measuring light pulse emitted to a measuring surface, and a measuring light detector detects an interference light of the reference light pulse reflected from the reference surface and the measuring light pulse reflected from the measuring surface, wherein the optical comb distance meter is capable of measuring a distance with high accuracy and in short time by calculating a difference between a distance to the reference surface and a distance to the measuring surface from a time difference of two interference signals obtained by the reference light detector and the measuring light detector (for example, refer to Patent Document 2).

Also, the present inventors have previously proposed an optical comb distance meter capable of measuring a long distance with high accuracy and in short time by defining a position of a reference point of a distance to a measuring surface by a reference light path (for example, refer to Patent Document 3).

In an optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as n, a phase difference of n-order mode of the reference signal and the measuring signal is calculated to offset a light phase difference of an optical comb production and transmission process from the optical comb generators to a reference point, and then, a distance from the reference point to the measuring surface is calculated by determining a phase difference of a reference signal pulse and a measuring signal pulse by calculating an increment of a phase difference per one order in a frequency axis.

Here, a distance measured by using a reference light pulse and a measuring light pulse output from two optical comb generators driven by a pair of modulation signals, which are having a frequency difference $\Delta f$ (for example, 500 kHz) and modulation frequency fin (for example, 25 GHz) of microwave band, is a remainder in which a distance of integral multiple of half-wavelength of the modulation frequency fm is subtracted from a whole distance (absolute distance) from the reference point to the measuring surface. The interference signal has a periodicity of $\Delta f$, and a phase difference of nearest reference signal and measuring signal is determined. When measuring a distance over half-wavelength, a phase in which a is multiplied by an integer is included as a phase corresponding to a time difference to a reference signal compared from a reference time. Its integral value cannot be determined by one set of frequency settings. Its integer can be inversely calculated as a value meeting a plurality of measuring conditions by performing distance measurements multiple times by changing fm slightly.

In other words, in an absolute distance measurement requiring a switching of frequencies, a time required for measurement will be a time including a frequency switching time, a measuring time, and an absolute distance calculating time.

Modulation signals for driving two optical comb generators can switch a frequency by using a modulation signal generator capable of setting a frequency, for example by PLL (Phase-Locked Loop).

A signal for driving an optical comb generator is desirable to have a little phase noise as possible. A frequency band of control is not expanded unduly when synchronizing VCO with little phase noise to an external reference signal, and in a frequency band in which a phase noise of VCO will be lower than a phase noise of a reference signal by aiming a cleanup of a driving signal, a control band is limited so that a characteristic of VCO will be exerted as it is.

A time in which a frequency of PLL comes to settle (settling time) is considered to be almost proportional to an inverse number of a control band, and the settling time will be longer if the control band is narrowed for aiming a cleanup, and when the control band is expanded for shortening the settling time, an increase of phase noise of high frequency band and an increase of mixing level of spurious signal relating to a comparison frequency occurs.

In a reference document relating to PLL (Non-Patent Document 1), as a designing example, when a bandwidth of a low pass filter is set to be about 207 kHz, it is introduced to lock a frequency within an error range of 1 kHz at about 51 microseconds. When a frequency divider circuit is set such that 500 kHz will be a unit of frequency setting, a bandwidth of the low pass filter has to be lowered in order to avoid a mixing in of the spurious signal, and it is expected that the settling time will take multiple times more than 51 microseconds.

Here, in two optical comb generators in an optical comb distance meter, a plurality of modulation signals respectively in a state that a frequency is fixed to a frequency in which a phase is synchronized to a reference frequency signal by a PLL circuit are supplied as driving signals by switching the modulation signals by a switching circuit.

Patent Document 1: JP 2001-343234 A
Patent Document 2: JP 5231883 B
Patent Document 3: JP 2020-12641 A
Non-Patent Document 1: Analog Dialogue, 52-07, July 2018 Phase-Locked Loop (PLL) Fundamentals, Author: Ian Collins

SUMMARY OF THE INVENTION

As mentioned in the above, in two optical comb generators in a conventional optical comb distance meter, a plurality of modulation signals respectively in a state that a frequency is fixed to a frequency in which a phase is synchronized to a reference frequency signal by a PLL circuit are supplied as driving signals by switching the modulation signals by a switching circuit, but there was a problem that an operation will be unstable by a load fluctuation of a modulation signal generator at an instance when switching a driving signal by a switching circuit.

Here, an experiment to analyze a transient response by a first experiment circuit 100 with a structure as illustrated in FIG. 7 was performed, and a result of analysis as illustrated in FIG. 8 was obtained.

A first experiment circuit 100 illustrated in FIG. 7 comprises: a synthesizer circuit 101 for outputting two independent frequency signals (FM1: 1000 MHz, FM2: 1000.5 MHz) with a difference frequency of 500 kHz; a switching circuit 102 with four inputs and two outputs; and a Double Balanced Mixer (DBM) 103, and a frequency signal of 1000.5 MHz is input from a FM2 terminal of the synthesizer circuit 101 to a RF input terminal of the DBM 103, and when a switch setting of the switching circuit 102 with four inputs and two outputs is set, a frequency signal of 1000 MHz is input from a FM1 terminal of the synthesizer circuit 101 to a LO input terminal of the DBM 103 with a delay time of about nano seconds via the switching circuit 102 with four inputs and two outputs.

In this first experiment circuit 100, a waveform signal of 500 kHz, which is a difference frequency of the frequency signal of 1000 MHz input to the LO input terminal and the frequency signal of 1000.5 MHz input to the RF input terminal, is output to an IF output terminal of the DBM 103, only while the switching circuit 102 with four inputs and two outputs is conducted.

FIG. 8(A) is a waveform chart plotted by obtaining a voltage value with 200 M sample/s (5 ns cycle) about a time waveform of the waveform signal of 500 kHz obtained by the IF output terminal of the DBM 103, and it is indicating that the switching circuit 102 will be ON near 5000 points and the waveform signal of 500 kHz is output from the IF output terminal.

FIG. 8(B) is a characteristic chart indicating a phase of 500 kHz component obtained by the IF output terminal of the DBM 103, and it is indicating that a phase fluctuation of 30 rad per 280 microseconds, i.e. a frequency deviation of about 17 kHz is occurred.

FIG. 8(C) is a characteristic chart indicating a power ratio of the waveform signal of 500 kHz obtained by the IF output terminal of the DBM 103 calculated by a FFT analysis, and FIG. 8(D) is an enlarged chart of its longitudinal axis.

A power ratio looks stable immediately after switching, but as illustrated in FIG. 8(D), a vibration remains even in 250 section, and it is indicating that a frequency of 500 kHz is not being stable.

Also, an experiment to analyze a transient response by a second experiment circuit 110 with a structure as illustrated in FIG. 9 was performed, and a result of analysis as illustrated in FIG. 10 was obtained.

In a second experiment circuit 110 illustrated in FIG. 9, an isolation circuit 105 is inserted between the synthesizer circuit 101 and the switching circuit 102 with four inputs and two outputs in the first experiment circuit 100, and it is configured to perform an isolation, and the other configurations are same as the first experiment circuit 100. The isolation circuit 105 is composed of an attenuator of 15 dB and a RF amplifier of 30 dB or more of a reverse isolation.

In this second experiment circuit 110, when a switch setting of the switching circuit 102 with four inputs and two outputs is set, a frequency signal of 1000 MHz is input from a FM1 terminal of the synthesizer circuit 101 to a LO input terminal of the DBM 103 via the isolation circuit 105 with a delay time of about nano seconds via the switching circuit 102 with four inputs and two outputs.

A waveform signal of 500 kHz, which is a difference frequency of the frequency signal of 1000 MHz input to the LO input terminal via the isolation circuit 105 and the frequency signal of 1000.5 MHz input to the RF input terminal, is output to an IF output terminal of the DBM 103, only while the switching circuit 102 with four inputs and two outputs is conducted.

FIG. 10(A) is a waveform chart plotted by obtaining a voltage value with 200 M sample/s (5 ns cycle) about a time waveform of the waveform signal of 500 kHz obtained by the IF output terminal of the DBM 103, and it is indicating that the switching circuit 102 will be ON near 5000 points and the waveform signal of 500 kHz is output from the IF output terminal.

FIG. 10(B) is a characteristic chart indicating a phase of 500 kHz component obtained by the IF output terminal of the DBM 103, and it is indicating that a phase fluctuation of 0.1 rad per 200 microseconds, i.e. a frequency deviation of about 80 Hz is occurred.

FIG. 10(C) is a characteristic chart indicating a power ratio of the waveform signal of 500 kHz obtained by the IF output terminal of the DBM 103 calculated by a FFT analysis, and FIG. 10(D) is its enlarged chart. A power ratio is stable immediately after switching, and as illustrated in FIG. 10(D), there is no vibration and a frequency is stable.

Considering the above circumstances, a purpose of the present invention is to provide an optical comb generation device capable of switching a driving frequency immediately by avoiding an unstable operating state following a switching of the driving frequency.

Also, a purpose of the present invention is to provide an optical comb generation device suitable to be used as an optical comb distance meter for measuring a distance from a time difference of an interference signal of a reference light and an interference signal of a measuring light.

Other purpose of the present invention, and concrete advantages obtained by the present invention will be clearer from an explanation of embodiments explained in below.

In the present invention, by inputting a modulation signal from a signal source to a switching circuit via an isolator by inserting the isolator between the signal source and the switching circuit, an operation of the signal source is prevented from being unstable with a load fluctuation by an opening or a short-circuit of circuits after the switching circuit, so an operation will not be unstable by a load fluctuation when switching a driving signal supplied to an optical comb generator by the switching circuit, and a driving state is transited by switching the driving signal of the optical comb generator rapidly.

That is, the present invention is an optical comb generation device, comprising: N signal sources for outputting N types of modulation signals with different frequency to each other wherein N is an integer of two or more; at least two isolators connected to the N signal sources; a switching circuit with N inputs and M outputs (M is a positive integer) to which the N types of modulation signals are input via the at least two isolators; and M optical comb generators to which the N types of modulation signals are input selectively via the at least two isolators and the switching circuit, wherein the M optical comb generators are respectively modulated of its phase or intensity periodically by at least two types of modulation signals of the N types of modulation signals, and output M types of optical combs with mutually different modulation cycles.

The optical comb generation device relating to the present invention comprises M of the optical comb generators wherein M is an integer of two or more, wherein the N types of modulation signals input to the switching circuit via N of the isolators connected to the N signal sources is input to the M optical comb generators by switching the modulation signals cyclically by the switching circuit, and M types of optical combs with mutually different N types of modulation cycles switched cyclically are output from the M optical comb generators.

Also, in the optical comb generation device relating to the present invention, N=4 and M=2, and by inputting four types of modulation signals to two optical comb generators by switching the modulation signals cyclically via the switching circuit, two types of optical combs with mutually different modulation cycles switched cyclically are output.

Also, in the optical comb generation device relating to the present invention, N=M=2, and two types of optical combs with mutually different modulation cycles are output alternately from two optical comb generators.

Also, in the optical comb generation device relating to the present invention, M=1, and by inputting the N types of modulation signals by switching the modulation signals cyclically via the switching circuit, optical combs in which the modulation cycles are switched cyclically are output from one optical comb generator.

Further, in the optical comb generation device relating to the present invention, the N signal sources generate N types of modulation signals respectively in a state that a frequency is fixed to a frequency in which a phase is synchronized to a reference frequency signal by a PLL circuit.

In the present invention, by inputting a modulation signal from a signal source to a switching circuit via an isolator by inserting the isolator between the signal source and the switching circuit, an operation of the signal source is prevented from being unstable with a load fluctuation by an opening or a short-circuit of circuits after the switching circuit, so an operation will not be unstable by a load fluctuation when switching a driving signal supplied to an optical comb generator by the switching circuit, and a driving state is transited by switching the driving signal of the optical comb generator rapidly.

In other words, in the present invention, an optical comb generation device capable of switching a driving frequency immediately by avoiding an unstable operating state following a switching of the driving frequency is provided.

Also, in the present invention, an optical comb generation device suitable to be used as an optical comb distance meter for measuring a distance from a time difference of an interference signal of a reference light and an interference signal of a measuring light is provided.

BRIEF DESCRIPTION OF THE DRAWINGS

FIG. 8(A) is a waveform chart illustrating a waveform signal of 500 kHz obtained by an IF output terminal of a DBM, FIG. 8(B) is a characteristic chart illustrating a phase of the 500 kHz component, FIG. 8(C) is a characteristic chart illustrating a power ratio of the waveform signal of 500 kHz determined by a FFT analysis and FIG. 8(D) is its enlarged chart.

FIG. 10(A) is a waveform chart illustrating a waveform signal of 500 kHz obtained by an IF output terminal of a DBM, FIG. 10(B) is a characteristic chart illustrating a phase of the 500 kHz component, FIG. 10(C) is a characteristic chart illustrating a power ratio of the waveform signal of 500 kHz determined by a FFT analysis and FIG. 10(D) is its enlarged chart.

DETAILED DESCRIPTION OF THE INVENTION

Figure 1:
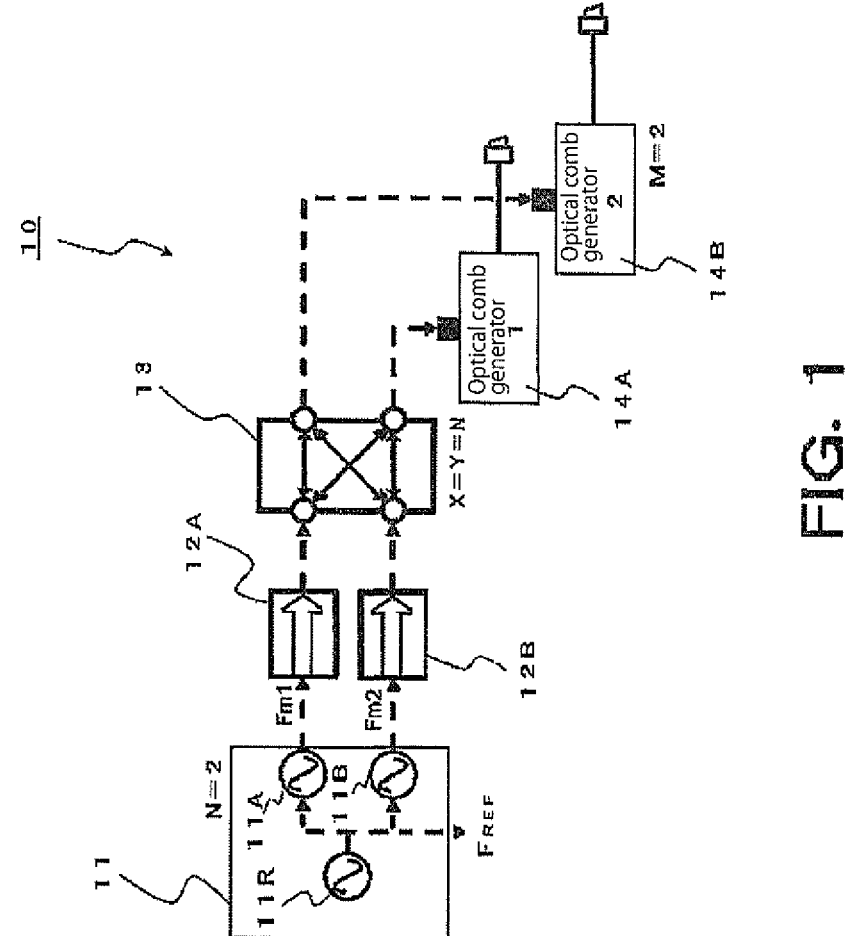
FIG. 1 is a block diagram illustrating an example of an optical comb generation device applying the present invention.

Hereinafter, explaining in detail about preferred embodiments of the present invention, with reference to the drawings. In addition, about common components, it is explained by giving common reference number in the drawings. Also, the present invention should not be limited to the following examples, it goes without saying that it can be changed optionally within a scope not deviating from a gist of the present invention.

For example, as illustrated in a block diagram of FIG. 1, the present invention is applied to an optical comb generation device 10 comprising two optical comb generators 14A, 14B for emitting a reference light and a measuring light with a coherence and mutually different modulation cycles, respectively modulated of its phase or intensity periodically.

This optical comb generation device 10 is used as a light source for emitting a reference light and a measuring light with a coherence and mutually different modulation cycles, respectively modulated of its phase or intensity periodically, in a three-dimensional shape measuring device or an optical comb distance meter for measuring a distance from a time difference of an interference signal of a reference light and an interference signal of a measuring light, for example as described in Patent Document 2, Patent Document 3, and else.

This optical comb generation device 10 comprises: a synthesizer circuit 11 for outputting two independent frequency signals (Fm1: 1000 MHz, Fm2: 1000.5 MHz) with a difference frequency of 500 kHz; a first isolator 12A connected to a Fm1 terminal of the synthesizer circuit 11; a second isolator 12B connected to a Fm2 terminal of the synthesizer circuit 11; a switching circuit 13 with two inputs and two outputs; a first optical comb generator 14A; and a second optical comb generator 14B, and the Fm1 terminal and the Fm2 terminal of the synthesizer circuit 11 are connected to two input terminals of the switching circuit 13 via the first isolator 12A and the second isolator 12B, and the first optical comb generator 14A and the second optical comb generator 14B are connected to two output terminals of the switching circuit 13.

The synthesizer circuit 11 comprises: a reference frequency signal generator 11R for generating a reference frequency signal FREF of 10 MHz; and a first modulation signal generator 11A and a second modulation signal generator 11B for generating a first modulation signal Fm1 and a second modulation signal Fm2 with different frequency to each other respectively in a state that a frequency is fixed to a frequency in which a phase is synchronized to the reference frequency signal FREF generated by the reference frequency signal generator 11R.

The first modulation signal generator 11A generates the first modulation signal Fm1 in a state that a frequency is fixed to a first frequency of 1000 MHz, in which a phase is synchronized to the reference frequency signal FREF generated by the reference frequency signal generator 11R, by a PLL circuit.

The second modulation signal generator 11B generates the second modulation signal Fm2 in a state that a frequency is fixed to a second frequency of 1000.5 MHz, in which a phase is synchronized to the reference frequency signal FREF generated by the reference frequency signal generator 11R, by a PLL circuit.

The first modulation signal Fm1 obtained by the first modulation signal generator 11A is input to one input terminal of the switching circuit 13 via the first isolator 12A connected to the Fm1 terminal of the synthesizer circuit 11, and selectively supplied to the first optical comb generator 14A and the second optical comb generator 14B connected to the two output terminals of the switching circuit 13.

Also, the second modulation signal Fm2 obtained by the second modulation signal generator 11B is input to another input terminal of the switching circuit 13 via the second isolator 12B connected to the Fm2 terminal of the synthesizer circuit 11, and selectively supplied to the first optical comb generator 14A and the second optical comb generator 14B connected to the two output terminals of the switching circuit 13.

The switching circuit 13 outputs the first modulation signal Fm1 and the second modulation signal Fm2 input to the two input terminals from the two output terminals alternately by switching the modulation signals, and functions as a selector switch with two inputs and two outputs for switching the first modulation signal Fm1 and the second modulation signal Fm2 to be supplied to the first optical comb generator 14A and the second optical comb generator 14B connected to the two output terminals as the driving signals.

In this optical comb generation device 10, by supplying the first modulation signal Fm1 and the second modulation signal Fm2 to the first optical comb generator 14A and the second optical comb generator 14B as the driving signals by switching the modulation signals by the switching circuit 13, two types of optical combs with mutually different modulation cycles can be output alternately from the first optical comb generator 14A and the second optical comb generator 14B.

And, in this optical comb generation device 10, the first modulation signal Fm1 and the second modulation signal Fm2 are input to the switching circuit 13 via the first isolator 12A and the second isolator 12B inserted between the synthesizer circuit 11 and the switching circuit 13, so as well as a result of experiment by the second experiment circuit 110, operations of the first modulation signal generator 11A and the second modulation signal generator 11B will not be unstable by a load fluctuation at a instance when switching the driving signals of the first optical comb generator 14A and the second optical comb generator 14B by the switching circuit 13, and a driving state can be transited by rapidly switching the driving signals of the first optical comb generator 14A and the second optical comb generator 14B.

In addition, when measuring an absolute distance requiring a switching of frequencies in a three-dimensional shape measuring device or an optical comb distance meter described in Patent Document 2, Patent Document 3 and else, a frequency switching time and an absolute distance measuring time will be included in a measuring time, but this optical comb generation device 10 can transit a driving state by rapidly switching the driving signals of the first optical comb generator 14A and the second optical comb generator 14B by inserting the first isolator 12A and the second isolator 12B between the synthesizer circuit 11 and the switching circuit 13, so a measuring time of an absolute distance can be shortened by using as two optical comb light sources for performing an absolute distance measurement by switching modulation frequencies of the reference signal and the measuring signal.

Here, the optical comb generation device 10 alternately outputs two types of optical combs with mutually different modulation cycles from two optical comb generators 14A, 14B, but the present invention is not limited only to the optical comb generation device 10 outputting the two types of optical combs alternately, and the optical comb generation device 10 may comprise: N signal sources for outputting N types of modulation signals with different frequency to each other wherein N is an integer of two or more; at least two isolators connected to the N signal sources; a switching circuit with X (integer of two or more) inputs and Y (positive integer) outputs to which the N types of modulation signals are input via the at least two isolators; and M optical comb generators to which the N types of modulation signals are input selectively via the at least two isolators and the switching circuit wherein M is a positive integer, and the M optical comb generators may be respectively modulated of its phase or intensity periodically by at least two types of modulation signals of the N types of modulation signals, and may output M types of optical combs with mutually different modulation cycles, and it may be N≠X≠Y≠M. A terminal resistor may be connected to an output terminal of the switching circuit not being used.

Figure 2:
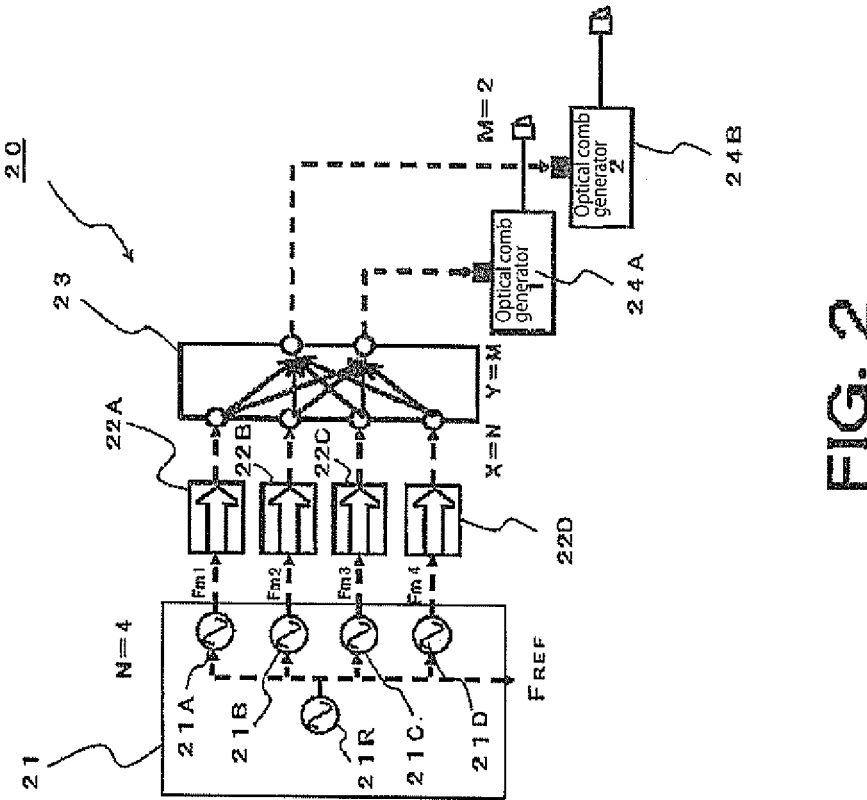
FIG. 2 is a block diagram illustrating other example of an optical comb generation device applying the present invention.
Figure 5:
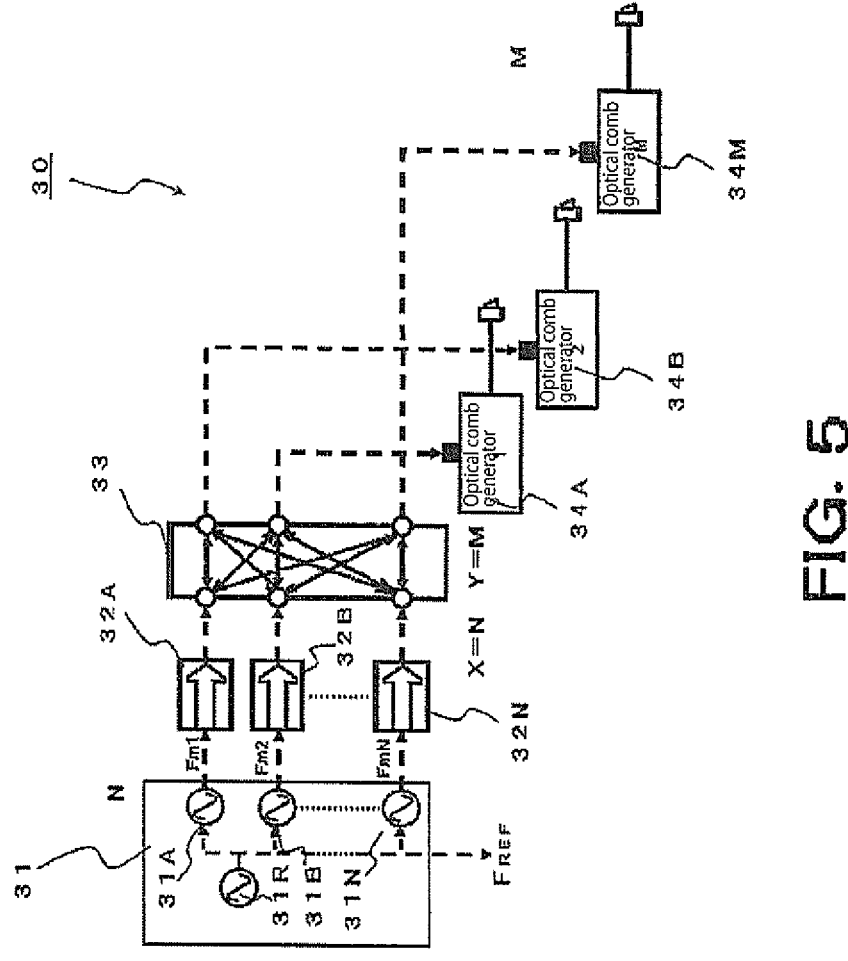
FIG. 5 is a block diagram illustrating other example of an optical comb generation device applying the present invention.
Figure 6:
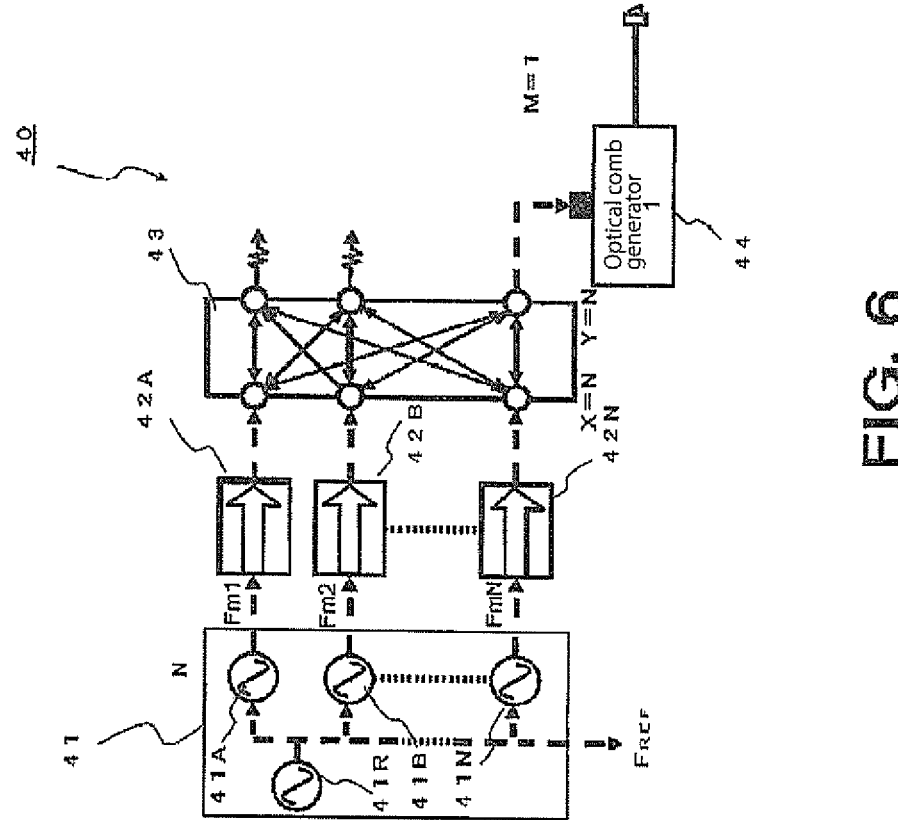
FIG. 6 is a block diagram illustrating other example of an optical comb generation device applying the present invention.
Figure 7:
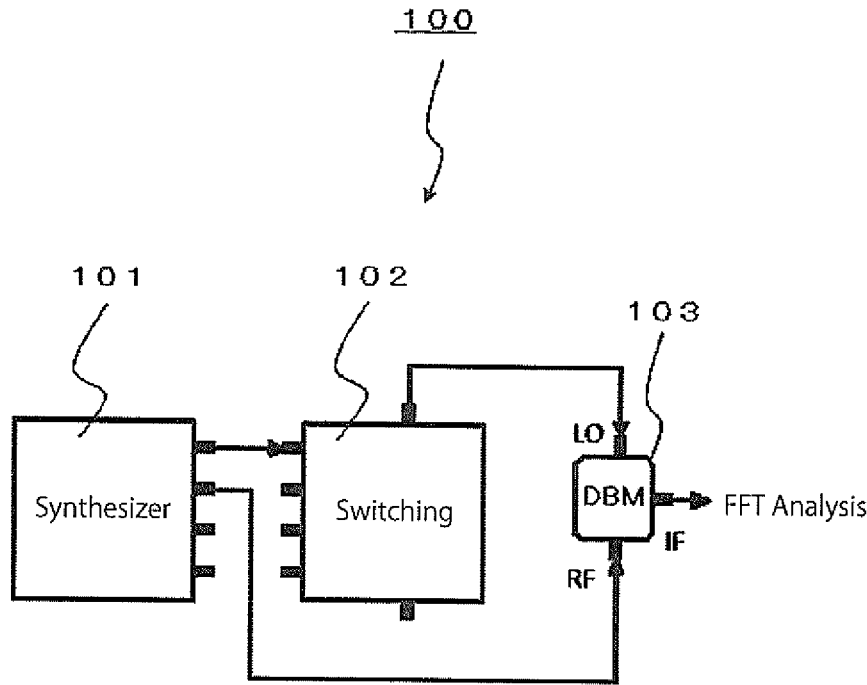
FIG. 7 is a block diagram illustrating a structure of a first experiment circuit used for an experiment for analyzing a transient response when switching driving signals, in which a phase is synchronized by the PLL circuit, by the switching circuit.
Figures 8A, 8B, 8C, 8D:
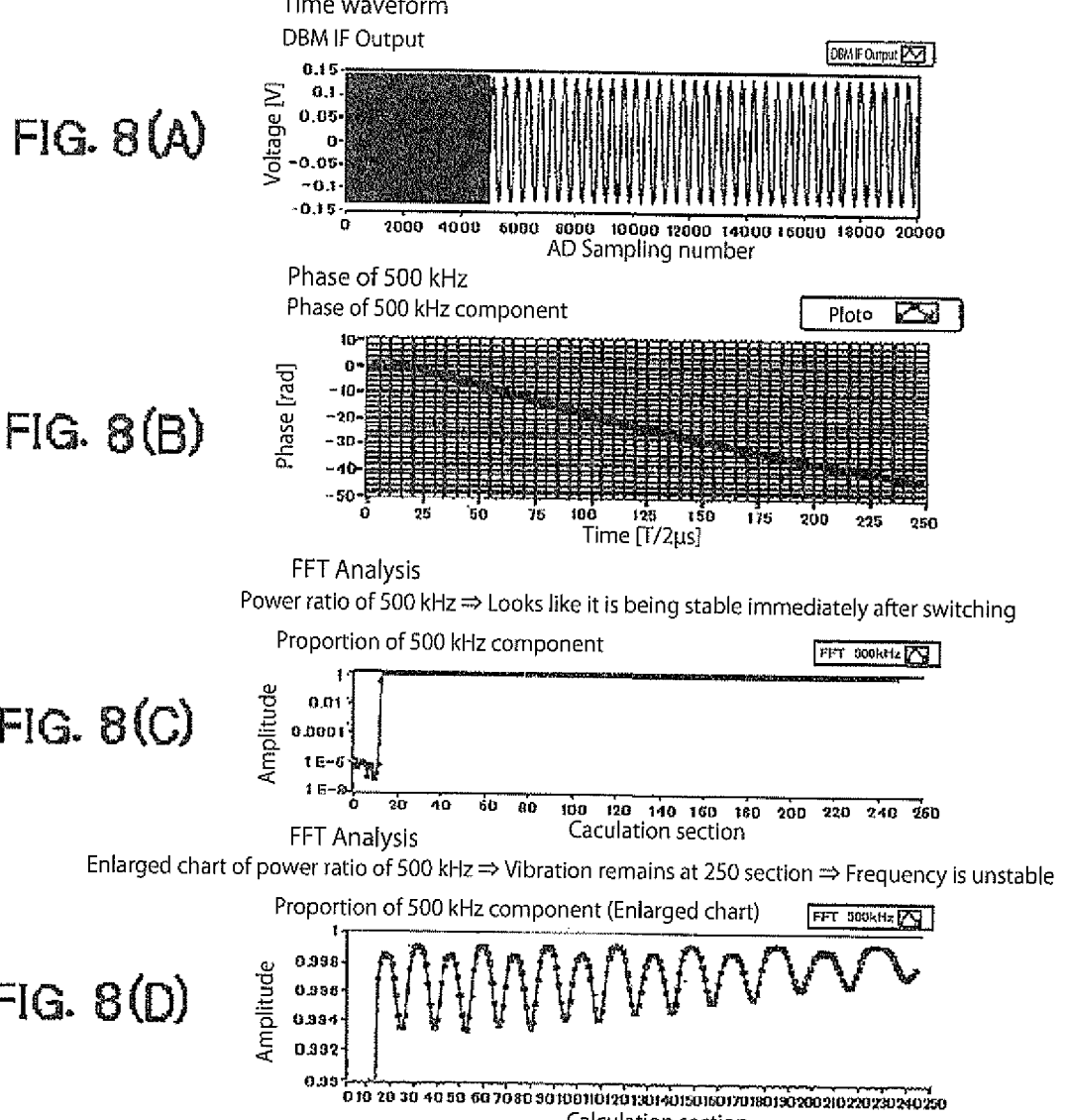
FIG. 8(A), FIG. 8(B), FIG. 8(C), and FIG. 8(D) are charts illustrating a result of the experiment by the first experiment circuit.
Figure 9:
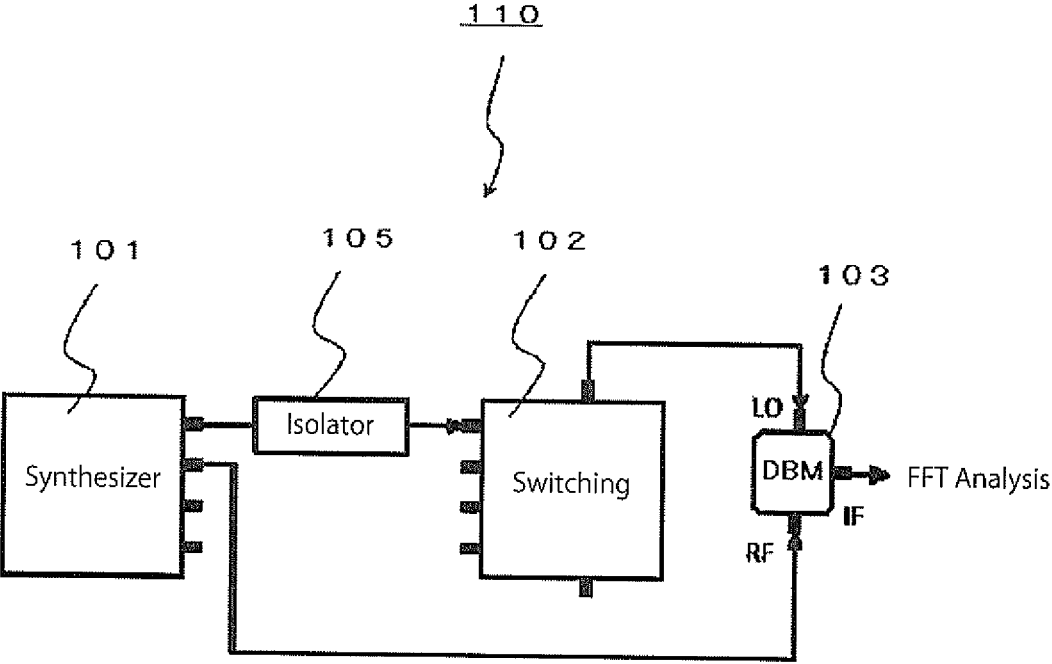
FIG. 9 is a block diagram illustrating a structure of a second experiment circuit used for an experiment for analyzing a transient response when switching driving signals, in which a phase is synchronized by the PLL circuit, by the switching circuit.
Figure 10:
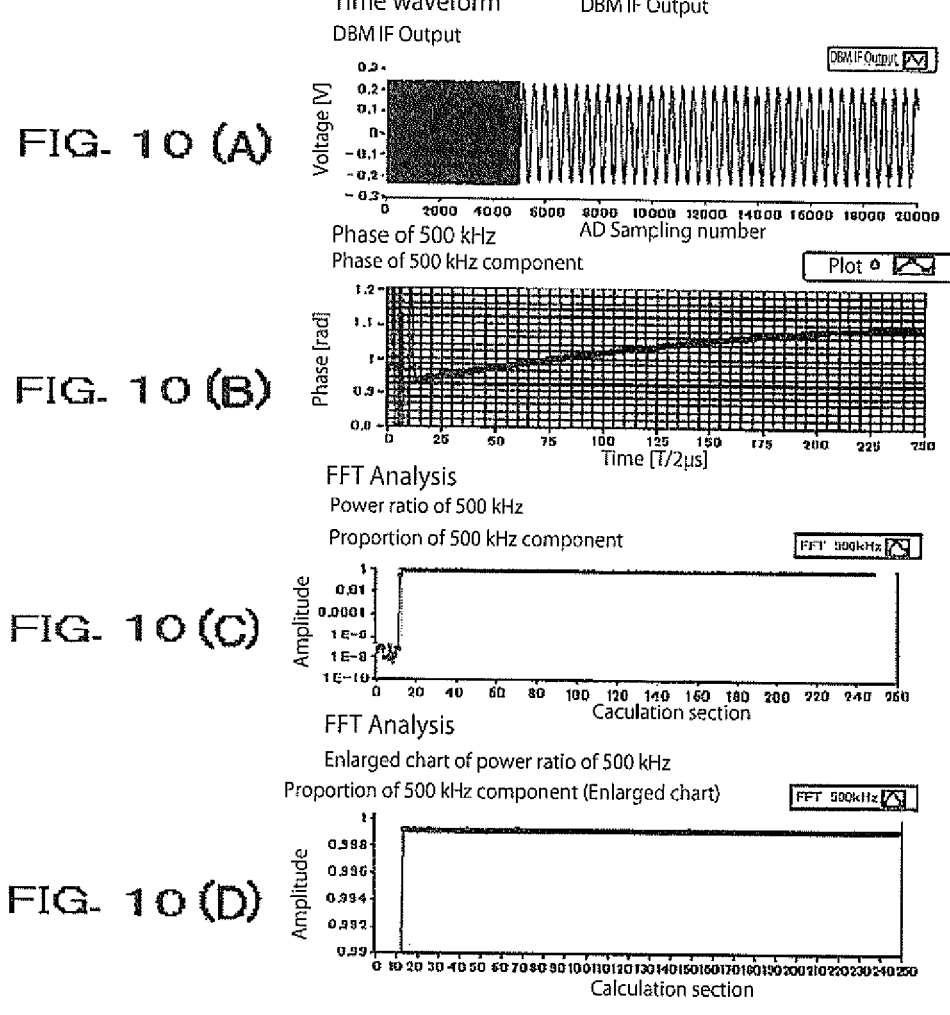
FIG. 10(A), FIG. 10(B), FIG. 10(C), and FIG. 10(D) are charts illustrating a result of the experiment by the second experiment circuit.

The present invention can be applied to various structures of optical comb generation devices such as a structure to cyclically output four types of modulation signals with mutually different modulation cycles to two optical comb generators 24A, 24B, wherein N=4, X=4, Y=2, M=2, as an optical comb generation device 20 illustrated in FIG. 2, a structure to output M types of optical combs with mutually different N types of modulation cycles switched cyclically from M optical comb generators 34A, 34B, . . . , 34M as an optical comb generation device 30 illustrated in FIG. 5, a structure to output optical combs with mutually different N types of modulation cycles switched cyclically from one optical comb generator 44, wherein N=X=Y, M=1, as an optical comb generation device 40 illustrated in FIG. 6.

In the optical comb generation device 20 illustrated in FIG. 2, wherein N=4 and M=2, by inputting four types of modulation signals output from a synthesizer circuit 21 to two optical comb generators 24A, 24B by switching the modulation signals cyclically via a switching circuit 23, the present invention is applied to an optical comb generation device for outputting two types of optical combs with mutually different modulation cycles switched cyclically, and the optical comb generation device 20 comprises: a synthesizer circuit 21 for outputting four independent frequency signals (Fm1: 1000 MHz, Fm2: 1010 MHz, Fm3: 1000.5 MHz, Fm4: 1010.5 MHz) with a difference frequency of 500 kHz; a first isolator 22A connected to a Fm1 terminal of the synthesizer circuit 21; a second isolator 22B connected to a Fm2 terminal of the synthesizer circuit 21; a third isolator 22C connected to a Fm3 terminal of the synthesizer circuit 21; a fourth isolator 22D connected to a Fm4 terminal of the synthesizer circuit 21; a switching circuit 23 with four inputs and two outputs; a first optical comb generator 24A; and a second optical comb generator 24B, and the Fm1 terminal, the Fm2 terminal, the Fm3 terminal, and the Fm4 terminal of the synthesizer circuit 21 are connected to four input terminals of the switching circuit 23 via the first isolator 22A, the second isolator 22B, the third isolator 22C and the fourth isolator 22D, and the first optical comb generator 24A and the second optical comb generator 24B are connected to two output terminals of the switching circuit 23.

The synthesizer circuit 21 comprises a reference frequency signal generator 21R for generating a reference frequency signal FREF of 10 MHz; and four modulation signal generators 21A, 21B, 21C, 21D for generating four types of modulation signals Fm1, Fm2, Fm3, Fm4 with different frequency to each other respectively in a state that a frequency is fixed to a frequency in which a phase is synchronized to the reference frequency signal FREF generated by the reference frequency signal generator 21R.

The first modulation signal generator 21A generates the first modulation signal Fm1 in a state that a frequency is fixed to a first frequency of 1000 MHz, in which a phase is synchronized to the reference frequency signal FREF generated by the reference frequency signal generator 21R, by a PLL circuit.

Also, the second modulation signal generator 21B generates the second modulation signal Fm2 in a state that a frequency is fixed to a second frequency of 1010 MHz, in which a phase is synchronized to the reference frequency signal FREF generated by the reference frequency signal generator 21R, by a PLL circuit.

Also, the third modulation signal generator 21C generates the third modulation signal Fm3 in a state that a frequency is fixed to a third frequency of 1000.5 MHz, in which a phase is synchronized to the reference frequency signal FREF generated by the reference frequency signal generator 21R, by a PLL circuit.

Further, the fourth modulation signal generator 21D generates the fourth modulation signal Fm4 in a state that a frequency is fixed to a fourth frequency of 1010.5 MHz, in which a phase is synchronized to the reference frequency signal FREF generated by the reference frequency signal generator 21R, by a PLL circuit.

And, the switching circuit 23 alternately outputs the four types of modulation signals Fm1, Fm2, Fm3, Fm4 input to four input terminals from the synthesizer circuit 21 via the first isolator 22A, the second isolator 22B, the third isolator 22C and the fourth isolator 22D from the two output terminals by switching the modulation signals cyclically, and functions as a selector switch with four inputs and two outputs for switching the four types of modulation signals Fm1, Fm2, Fm3, Fm4 to be supplied to the first optical comb generator 24A and the second optical comb generator 24B connected to the two output terminals as the driving signals.

Figure 3:
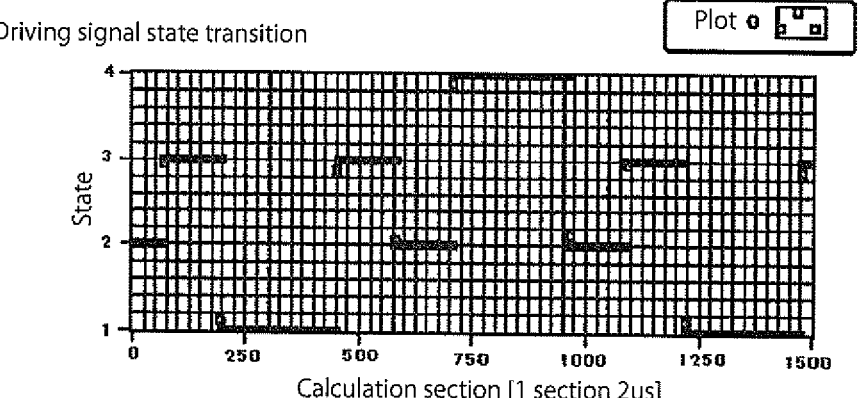
FIG. 3 is a state transition diagram illustrating a state transition of driving signals supplied to two optical comb generators in the other example of the optical comb generation device.

As a transition state of driving signals to the first and second optical comb generators 24A, 24B in the optical comb generation device 20 is illustrated in FIG. 3, the switching circuit 23 cyclically switches the four types of modulation signals Fm1, Fm2, Fm3, Fm4 supplied to the first and second optical comb generators 24A, 24B as the driving signals.

Here, the optical comb generation device 20 generates two types of optical combs as a reference light pulse and a measuring light pulse for performing an absolute distance measurement requiring a switching of frequencies in a three-dimensional shape measuring device or an optical comb distance meter described in Patent Document 2, Patent Document 3 and else, and as indicated in Table 1, by supplying the four types of modulation signals Fm1, Fm2, Fm3, Fm4 to the first and second optical comb generators 24A, 24B as the driving signals by switching the modulation signals cyclically by the switching circuit 23, two types of optical combs with mutually different modulation cycles switched cyclically are output.

TABLE 1

| Setting | OFCG1/OFCG2 | Phase difference |
|---------|-------------|------------------|
| #1 | $f_m/(f_m + \Delta f)$ | $-2\pi f_m T$ |
| #2 | $(f_m + \Delta f_m)/(f_m + \Delta f_m + \Delta f)$ | $-2\pi(f_m + \Delta f_m)T$ |
| #3 | $(f_m + \Delta f)/f_m$ | $-2\pi(f_m + \Delta f)T$ |
| #4 | $(f_m + \Delta f_m + \Delta f)/f_m + \Delta f_m)$ | $-2\pi(f_m + \Delta f_m + \Delta f)T$ |

Table 1 indicates a transition state OFCG1/OFCG2 of driving signals of the first and second optical comb generators 24A, 24B in settings of #1 to #4 and its phase difference, that is a phase amending a reference number inversed depending on a magnitude correlation of driving frequencies of OFCG1 side and OFCG2 side, and frequencies of driving signals are, for example $\Delta f$=500 kHz, $\Delta$fm=10 MHz, fm=Fm1 (1000 MHz), fm+$\Delta$fm=Fm2 (1010 MHz), fm+$\Delta$f=Fm3 (1000.5 MHz), fm+$\Delta$fm+$\Delta$ f=Fm4 (1010.5 MHz). In addition, in frequency settings #1 to #4 of driving signals in the first and second optical comb generators 24A, 24B implemented in an optical comb distance meter, by using a synthesizer circuit 21 of 1 GHz band combining with an up converter, it will be $\Delta f$=500 kHz, $\Delta$fm=10 MHz, fm=Fm1 (25000 MHz), fm+$\Delta$ fm=Fm2 (25010 MHz), fm+$\Delta$f=Fm3 (25000.5 MHz), fm+$\Delta$fm+$\Delta$f=Fm4 (25010.5 MHz).

Here, in the optical comb distance meter, by using a reference light pulse and a measuring light pulse with coherence emitted as a pulse from two optical comb generators driven by two types of modulation signals with different frequencies in principle, a frequency analysis of an interference signal (hereinafter, referred to as a reference signal) obtained by a reference light detector and an interference signal (hereinafter, referred to as a measuring signal) obtained by a measuring light detector is performed by a signal processing unit, and a mode number counted from a center frequency of an optical comb is defined as n, a phase difference of n-order mode of the reference signal and the measuring signal is calculated to offset a light phase difference of an optical comb production and transmission process from the optical comb generators to a reference point, and then, a distance from the reference point to a measuring surface is calculated by determining a phase difference of signal pulses by calculating an increment of a phase difference per one order in a frequency axis.

In addition, when a measuring distance is beyond a half-wavelength of a modulation frequency fm, a distance of integral multiple of a half-wavelength will be unidentifiable due to a periodicity of an object light, and a distance cannot be determined uniquely, so measurements are performed four times by using the reference light pulse and the measuring light pulse in which modulation frequencies are set in four ways as indicated in Table 1, and in the signal processing unit, a distance beyond an ambiguity distance ($L_a$=c/2fm c: light speed) corresponding to a half-wavelength is calculated by using each of phase difference obtained by performing same process.

In other words, a phase difference of the reference signal and the measuring signal obtained by measuring the modulation frequencies set in four ways as indicated in Table 1 will be: $-2\pi$fmT in a setting of #1 in which modulation frequencies of modulation signals for driving two optical comb generators (OFCG1, OFCG2) are fm and fm+$\Delta$f; $-2\pi$(fm+$\Delta$fm)T in a setting of #2 in which the modulation frequencies of the modulation signals are fm+$\Delta$fm and fm+$\Delta$fm+$\Delta$f; $-2\pi$(fm+$\Delta$f)T in a setting of #3 in which the modulation frequencies of the modulation signals are fm+$\Delta$f and fm; and $-2\pi$(fm+$\Delta$fm+$\Delta$f)T in a setting of #4 in which the modulation frequencies of the modulation signals are fm+$\Delta$fm+$\Delta$f and fm+$\Delta$fm.

When a distance measured in a setting of #1 is longer than a distance ($L_a$=c/2fm c: light speed) corresponding to a half-wavelength of the modulation frequency fm, a phase difference ($-2\pi$fmT) of the reference signal and the measuring signal will be in a form of $\varphi$+2m$\pi$ wherein m is an integer, and $\varphi$ can be determined by calculation, but an integer value m is unidentifiable.

On the other hand, a difference between the phase difference $-2\pi$fmT of the reference signal and the measuring signal in the setting of #1 and the phase difference $-2\pi$(fm+$\Delta$fm)T of the reference signal and the measuring signal in the setting of #2 is $2\pi\Delta$fmT, and also, a difference between the phase difference $-2\pi$(fm+$\Delta$f)T of the reference signal and the measuring signal in the setting of #3 and the phase difference $-2\pi$(fm+$\Delta$fm+$\Delta$f)T of the reference signal and the measuring signal in the setting of #4 is $2\pi\Delta$fmT, and a phase will be determined uniquely until a distance (when $\Delta$ fm=10 MHz, La is 15 m) corresponding to a half-wavelength of $\Delta$fm.

And, the integer m can be determined by comparing with the phase difference of #1 by multiplying this phase by fm/$\Delta$fm.

Further, $2\pi\Delta$f is obtained from a difference between the phase difference $-2\pi$fmT in the setting of #1 and the phase difference $-2\pi$(fm+$\Delta$f)T in the setting of #3.

Here, when fm=25 GHz, $\Delta$f=500 kHz, $\Delta$fm=10 MHz, as $\Delta$f=500 kHz, a distance measurement until La=300 m can be performed.

In an optical comb distance meter mounting this optical comb generation device 20, an absolute distance measurement is performed by using the reference signal and the measuring signal obtained by measuring the modulation frequencies set in four ways as indicated in Table 1. In other words, after maintaining one state for a certain time, it will be transit to other state, and a signal phase measurement of the state is performed at a certain period, and a calculation process of an absolute distance is performed by using phases of setting states of #1, #2, #3, #4.

A measurement speed in the optical comb distance meter is 500 kHz as equal to $\Delta$f in a relative distance measurement within 6 mm, but in an absolute distance measurement requiring a switching of frequencies, it will be a time including a frequency switching time and an absolute distance calculating time.

In the optical comb generation device 20, by inserting four isolators 22A, 22B, 22C, 22D between the synthesizer circuit 21 and the switching circuit 23, a driving state of the first and second optical comb generators 24A, 24B can be transit rapidly by switching the four types of modulation signals Fm1, Fm2, Fm3, Fm4 cyclically by the switching circuit 23, and a measuring time of an absolute distance can be shortened by using as two optical comb light sources for performing absolute distance measurement by switching modulation frequencies of the reference signal and the measuring signal.

In addition, when performing a distance measurement only, it can be performed by the settings of #1 and #2 only, or by the settings of #3 and #4 only, but by the settings of #1, #2, #3, #4 as the above, in other words, by switching the four types of modulation signals Fm1, Fm2, Fm3, Fm4 cyclically by the switching circuit 23, an absolute distance measurement result with high accuracy can be obtained by reducing a phase offset according to a signal transmission path of a distance other than a distance to be measured. In other words, when switching modulation frequencies of two optical comb generators (OFCG1, OFCG2), in a phase derived from a distance to be measured, an absolute value will not be changed, but a sign will be inversed. On the other hand, in an offset derived from a length of a cable of an interference signal transmission path, a sign will not be changed and will be a constant value. Therefore, a phase value excluding an offset can be determined by subtracting results of two phase measurements and dividing by two.

Figure 4:
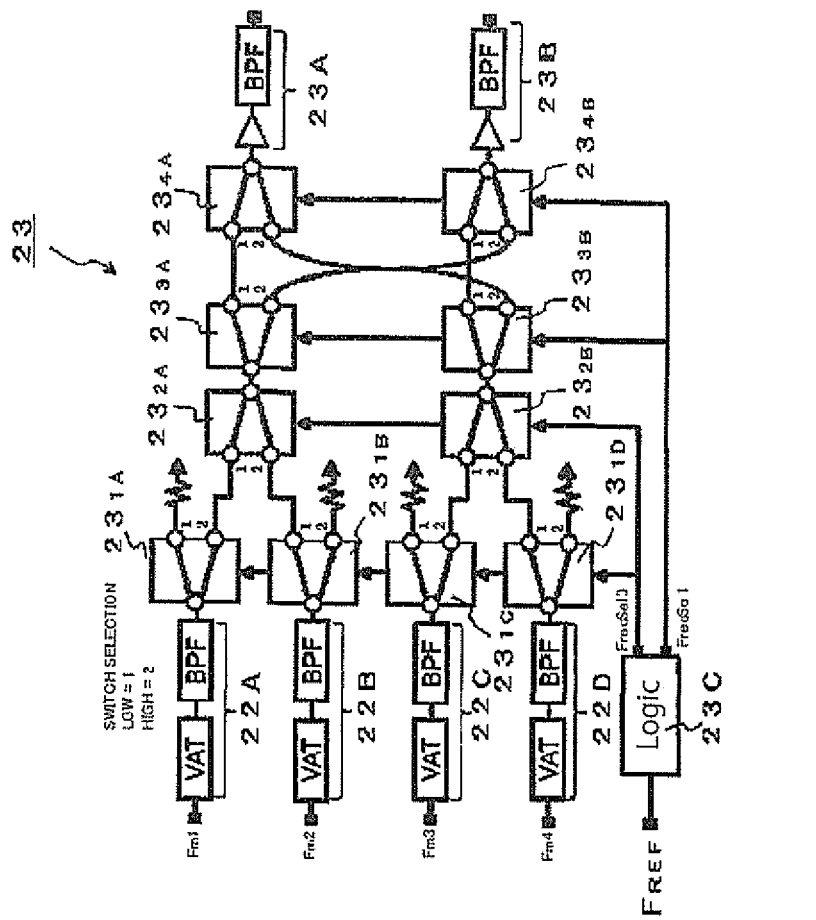
FIG. 4 is a block diagram illustrating a concrete example of a switching circuit in the other example of the optical comb generation device.

Here, FIG. 4 is a block diagram illustrating a concrete example of a switching circuit 23 with four inputs and two outputs composed in the optical comb generation device 20.

In other words, as illustrated in FIG. 4, in the switching circuit 23: four switching circuits 23$_{1A}$, 23$_{1B}$, 23$_{1C}$, 23$_{1D}$ of first stage respectively with one input and two outputs which are inputted with four types of modulation signals Fm1, Fm2, Fm3, Fm4 generated by modulation signal generators 21A, 21B, 21C, 21D of the synthesizer circuit 21 via isolators 22A, 22B, 22C, 22D connected to Fm1 terminal, Fm2 terminal, Fm3 terminal, Fm4 terminal of the synthesizer circuit 21; two switching circuits 23$_{2A}$, 23$_{2B}$ of next stage respectively with two inputs and one output which are inputted with the four types of modulation signals Fm1, Fm2, Fm3, Fm4 via the four switching circuits 23$_{1A}$, 23$_{1B}$, 23$_{1C}$, 23$_{1D}$ of first stage; two switching circuits 23$_{3A}$, 23$_{3B}$ of further next stage respectively with one input and two outputs connected to each output terminal of the two switching circuits 23$_{2A}$, 23$_{2B}$; and two switching circuits 23$_{4A}$, 23$_{4B}$ of final stage respectively with two inputs and one output connected to the two switching circuits 23$_{3A}$, 23$_{3B}$, are controlled of its switching by a control logic 23C synchronized to a reference signal FREF of 10 MHz, and as a transition state of driving signals of the first and second optical comb generators 24A, 24B are illustrated in FIG. 3, the four types of modulation signals Fm1, Fm2, Fm3, Fm4 supplied to the first and second optical comb generators 24A, 24B as driving signals are switched cyclically.

In this switching circuit 23, in the four switching circuits 23$_{1A}$, 23$_{1B}$, 23$1c$, 23$_{1D}$ of first stage, one of two output terminals is respectively connected to input terminals of the two switching circuits 23$_{2A}$, 23$_{2B}$ of next stage, and other output terminal is terminated by a terminal resistor.

In addition, in a concrete example of the switching circuit 23 illustrated in a block diagram of FIG. 4, the four types of modulation signals Fm1, Fm2, Fm3, Fm4 are input to the four switching circuits 23$_{1A}$, 23$_{1B}$, 23$_{1C}$, 23$_{1D}$ of first stage via first to fourth isolators 22A, 22B, 22C, 22D respectively composed of an isolator circuit combining a variable attenuator and a band pass filter, and from output terminals of the two switching circuits 23$_{4A}$, 23$_{4B}$ of final stage, the four types of modulation signals Fm1, Fm2, Fm3, Fm4 switched cyclically are output via a first and second isolators 23A, 23B respectively composed of an isolator circuit combining an isolation amplifier and a band pass filter.

Also, in an optical comb generation device 30 illustrated in FIG. 5, M types of optical combs with mutually different N types of modulation cycles switched cyclically are output from M optical comb generators 34A, 34B, . . . , 34M, and the optical comb generation device 30 comprises: a synthesizer circuit 31 for outputting N types of independent frequency signals Fm1, Fm2, . . . , FmN with a difference frequency of Δf; N isolators 32A, 32B, . . . , 32N connected to N output terminals of the synthesizer circuit 31; a switching circuit 33 with N inputs and M outputs; and M optical comb generators 34A, 34B, . . . , 34M, and N output terminals of the synthesizer circuit 31 are connected to N input terminals of the switching circuit 33 via the N isolators 32A, 32B, . . . , 32N, and the M optical comb generators 34A, 34B, . . . , 34M are connected to M output terminals of the switching circuit 33.

The synthesizer circuit 31 comprises: a reference frequency signal generator 31R for generating a reference frequency signal FREF of 10 MHz; and N modulation signal generators 31A, 31B, . . . , 31N for generating N types of modulation signals Fm1, Fm2, . . . , FmN with different frequency to each other respectively in a state that a frequency is fixed to a frequency in which a phase is synchronized to the reference frequency signal FREF generated by the reference frequency signal generator 31R.

And, the switching circuit 33 cyclically outputs the N types of modulation signals Fm1, Fm2, . . . , FmN input to the N input terminals from the synthesizer circuit 31 via the N isolators 32A, 32B, . . . , 32N from the M output terminals by switching the modulation signals cyclically, and functions as a selector switch with N inputs and M outputs for switching the N types of modulation signals Fm1, Fm2, . . . , FmN to be supplied to the M optical comb generators 34A, 34B, . . . , 34M connected to the M output terminals as driving signals.

In this optical comb generation device 30, a combination of one or more pairs of optical combs supplied to an optical comb interference system in an optical comb distance meter can be provided, and N isolators 32A, 32B, . . . , 32N are inserted between the synthesizer circuit 31 and the switching circuit 33, so frequencies of N modulation signal generators 31A, 31B, . . . , 31N composing the synthesizer circuit 31 can be maintained in a stable state without being affected by a load fluctuation by an opening or a short-circuit of circuits after the switching circuit 33, and driving signals to be supplied to the M optical comb generators 34A, 34B, . . . , 34M by the switching circuit 33 can be switched cyclically to perform a phase measurement immediately after switching.

In addition, in this optical comb generation device 30, N and M are two or more, but not limited to N=M. Generally, N≥M, and when N<M, a signal supply will be performed by combining with a power divider, or optical comb generators in which the signal is not supplied will exist.

Further, in an optical comb generation device 40 illustrated in FIG. 6, M=1, optical combs in which N types of modulation cycles are switched cyclically are output from one optical comb generator 44, and the optical comb generation device 40 comprises: a synthesizer circuit 41 for outputting N types of independent frequency signals Fm1, Fm2, . . . , FmN; N isolators 42A, 42B, . . . , 42N connected to N output terminals of the synthesizer circuit 41; a switching circuit 43 with N inputs and one output; and one optical comb generator 44, and N output terminals of the synthesizer circuit 41 are connected to N input terminals of the switching circuit 43 via the N isolators 42A, 42B, . . . , 42N, and the optical comb generator 44 is connected to an output terminal of the switching circuit 43.

The synthesizer circuit 41 comprises: a reference frequency signal generator 41R for generating a reference frequency signal FREF; and N modulation signal generators 41A, 41B, . . . , 41N for generating N types of modulation signals Fm1, Fm2, . . . , FmN with different frequency to each other respectively in a state that a frequency is fixed to a frequency in which a phase is synchronized to the reference frequency signal FREF generated by the reference frequency signal generator 41R.

And, the switching circuit 43 cyclically outputs the N types of modulation signals Fm1, Fm2, . . . , FmN input to the N input terminals from the synthesizer circuit 41 via the N isolators 42A, 42B, . . . , 42N from the output terminal by switching the modulation signals cyclically, and functions as a selector switch with N inputs and one output for switching the N types of modulation signals Fm1, Fm2, . . . , FmN to be supplied to the optical comb generator 44 connected to the output terminal as driving signals.

In this optical comb generation device 40, N isolators 42A, 42B, . . . , 42N are inserted between the synthesizer circuit 41 and the switching circuit 43, so frequencies of N modulation signal generators 41A, 41B, . . . , 41N composing the synthesizer circuit 41 can be maintained in a stable state without being affected by a load fluctuation by an opening or a short-circuit of circuits after the switching circuit 43, and the N types of modulation signals Fm1, Fm2, . . . , FmN can be switched cyclically by the switching circuit 43 rapidly to be supplied to the optical comb generator 44 as driving signals.

This optical comb generation device 40 is used as a sole optical comb light source for emitting optical combs from the optical comb generator 44 operated by the N types of modulation signals Fm1, Fm2, . . . , FmN switched cyclically by the switching circuit 43 as the driving signals.

In addition, in the optical comb generation device 10, 20, 30, 40, as the isolators 12A, 12B, 22A to 22D, 32A to 32N, 42A to 42N inserted between the synthesizer circuit 11, 21, 31, 41 and the switching circuit 13, 23, 33, 43, a microwave amplifier with large reverse isolation, Pi-pad attenuator or T-pad attenuator, an isolation element such as a microwave isolator using a ferrite, an isolation circuit combining a variable attenuator and a band pass filter or an isolation circuit combining an isolation amplifier, a resistance attenuator and a band pass filter, and else can be used. Also, an isolator may exist independent from the synthesizer circuit or the switching circuit as another housing, or it may be arranged at an output of the synthesizer circuit or at an input of the switching circuit as a part of respective circuit.

Glossary of Drawing References

10, 20, 30, 40 Optical comb generation device
11, 21, 31, 41 Synthesizer circuit
13, 23, 23$_{1A}$, 23$_{1B}$, 23$_{1C}$, 23$_{1D}$, 23$_{2A}$, 23$_{2B}$, 23$_{3A}$, 23$_{3B}$, 23$_{4A}$, 23$_{4B}$, 33, 43 Switching circuit
12A, 12B, 22A to 22D, 32A to 32N, 42A to 42N Isolator
14A, 14B, 24A, 24B, 34A to 34M, 44 Optical comb generator 23C Control logic

The invention claimed is:

1. An optical comb generation device, comprising:
N signal sources for outputting N types of modulation signals with different frequency to each other wherein N is an integer of two or more;

at least two isolators connected to the N signal sources;
a switching circuit with X inputs (X is an integer of two or more) and Y outputs (Y is a positive integer) to which the N types of modulation signals are input via the at least two isolators; and
M optical comb generators to which the N types of modulation signals are input selectively via the at least two isolators and the switching circuit wherein M is a positive integer,
wherein the M optical comb generators are respectively modulated of its phase or intensity periodically by at least two types of modulation signals of the N types of modulation signals, and output M types of optical combs with mutually different modulation cycles.

2. The optical comb generation device according to claim 1, comprising M of the optical comb generators wherein M is an integer of two or more, wherein the N types of modulation signals input to the switching circuit via N of the isolators connected to the N signal sources are input to the M optical comb generators by switching the modulation signals cyclically by the switching circuit, and M types of optical combs with mutually different N types of modulation cycles switched cyclically are output from the M optical comb generators.

3. The optical comb generation device according to claim 2, wherein N=4 and M=2, and by inputting four types of modulation signals to two optical comb generators by switching the modulation signals cyclically via the switching circuit, two types of optical combs with mutually different modulation cycles switched cyclically are output.

4. The optical comb generation device according to claim 1, wherein N=M=2, and two types of optical combs with mutually different modulation cycles are output alternately from two optical comb generators.

5. The optical comb generation device according to claim 1, wherein M=1, and by inputting the N types of modulation signals input to the switching circuit via N of the 25 isolators connected to the N signal sources by switching the modulation signals cyclically via the switching circuit, optical combs in which the modulation cycles are switched cyclically are output from one optical comb generator.

6. The optical comb generation device according to claim 1, wherein the N signal sources generate N types of modulation signals respectively in a state that a frequency is fixed to a frequency in which a phase is synchronized to a reference frequency signal by a PLL circuit.

* * * * *